US009767387B2

(12) United States Patent
Chaki et al.

(10) Patent No.: US 9,767,387 B2
(45) Date of Patent: Sep. 19, 2017

(54) PREDICTING ACCURACY OF OBJECT RECOGNITION IN A STITCHED IMAGE

(71) Applicant: Accenture Global Services Limited, Dublin (IE)

(72) Inventors: Ayan Chaki, Bangalore (IN); Vinay Kumar, Bangalore (IN); Prosenjit Banerjee, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 75 days.

(21) Appl. No.: 14/921,372

(22) Filed: Oct. 23, 2015

(65) Prior Publication Data

US 2017/0068840 A1 Mar. 9, 2017

(30) Foreign Application Priority Data

Sep. 9, 2015 (IN) .......................... 4784/CHE/2015

(51) Int. Cl.
*G06K 9/00* (2006.01)
*G06K 9/62* (2006.01)

(52) U.S. Cl.
CPC ................. *G06K 9/6262* (2013.01)

(58) Field of Classification Search
None
See application file for complete search history.

(56) References Cited

U.S. PATENT DOCUMENTS

| 2008/0306787 | A1 | 12/2008 | Hamilton et al. | |
|---|---|---|---|---|
| 2009/0192921 | A1* | 7/2009 | Hicks | G06F 3/0312 705/28 |
| 2009/0208080 | A1* | 8/2009 | Grau | G06T 5/50 382/131 |
| 2011/0249910 | A1 | 10/2011 | Henderson et al. | |
| 2014/0270425 | A1 | 9/2014 | Kenny et al. | |
| 2015/0248591 | A1 | 9/2015 | Shi et al. | |
| 2015/0304557 | A1* | 10/2015 | Choi | H04N 5/2258 348/218.1 |

(Continued)

OTHER PUBLICATIONS

Möller et al., "Towards Objective Quality Assessment of Image Registration Results," http://citeseerx.ist.psu.edu/viewdoc/summary?doi=10.1.1.105.677, Aug. 15, 2007, 8 pages.

(Continued)

*Primary Examiner* — Vikkram Bali
(74) *Attorney, Agent, or Firm* — Harrity & Harrity, LLP

(57) ABSTRACT

A device may receive a set of images for an object recognition operation to identify one or more objects in the set of images after the set of images are combined into a stitched image. The device may combine the set of images into the stitched image. The device may determine reliability scores for the set of images. The reliability scores may be determined based on a difference in images of the set of images, and the reliability scores may predict a quality of the stitched image that includes an image, of the set of images, to which the reliability scores correspond. The device may determine whether a result of the object recognition operation is likely to satisfy a threshold based on the reliability scores. The device may selectively perform the object recognition operation based on whether the result of the object recognition operation is likely to satisfy the threshold.

20 Claims, 12 Drawing Sheets

(56) References Cited

U.S. PATENT DOCUMENTS

2016/0150213 A1* 5/2016 Mutti .................... G06T 7/0085
348/143

OTHER PUBLICATIONS

Extended European Search Report corresponding to EP 15 19 9566.9, mailed Aug. 19, 2016, 11 pages.
Wikipedia, "HSL and HSV," https://web.archieve.org/web/20110914175905/http://en.wikipedia.org/wiki/HSL_and HSV, Sep. 14, 2011 as per Wayback Machine, 18 pages.

* cited by examiner

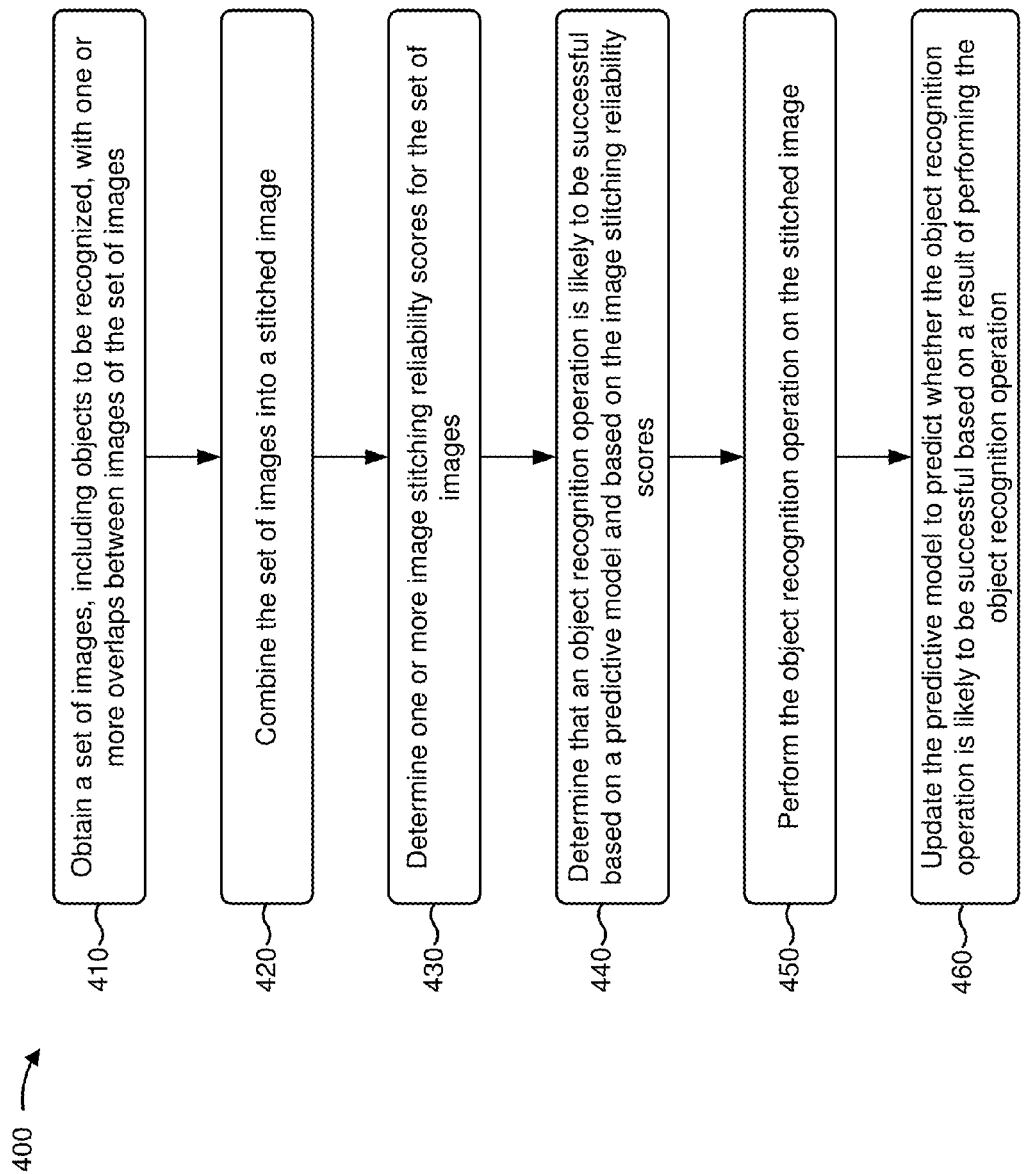

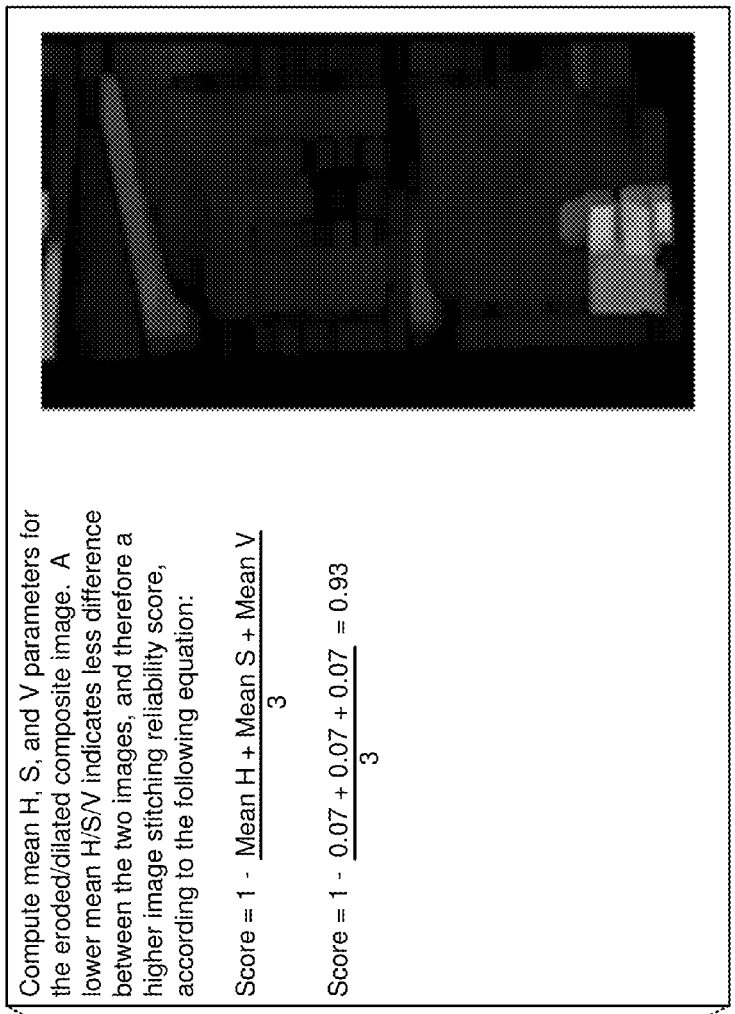
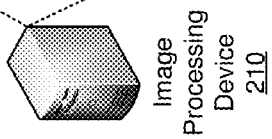
Compute mean H, S, and V parameters for the eroded/dilated composite image. A lower mean H/S/V indicates less difference between the two images, and therefore a higher image stitching reliability score, according to the following equation:
$$Score = 1 - \frac{Mean\ H + Mean\ S + Mean\ V}{3}$$
$$Score = 1 - \frac{0.07 + 0.07 + 0.07}{3} = 0.93$$
Image Processing Device 210
FIG. 7D

PREDICTING ACCURACY OF OBJECT RECOGNITION IN A STITCHED IMAGE

RELATED APPLICATION

This application claims priority under 35 U.S.C. §119 to Indian Provisional Patent Application No. 4784/CHE/2015, filed on Sep. 9, 2015, the content of which is incorporated by reference herein in its entirety.

BACKGROUND

An image capture device, such as a camera, a mobile phone that includes a camera, or the like, may capture a set of images with some overlap between images of the set of images. The set of images may be combined, or stitched, into a stitched image based on the overlap between the images, to capture an image of a wide area at a higher resolution than the resolutions of each individual image. In some cases, a device may perform an object recognition operation to detect objects in the stitched image. For example, the stitched image may show a store shelf, and the device may perform an object recognition operation to determine which products are stocked on the store shelf.

SUMMARY

A device may include one or more processors. The device may receive a set of images for an object recognition operation. The object recognition operation may identify one or more objects in the set of images after the set of images are combined into a stitched image. The device may combine the set of images into the stitched image. The device may determine one or more reliability scores for the set of images. The one or more reliability scores may be determined based on a difference in a color parameter of two or more images of the set of images, and the one or more reliability scores may predict a quality of the stitched image that includes an image, of the set of images, to which the one or more reliability score corresponds. The device may determine whether a result of the object recognition operation is likely to satisfy a threshold based on the one or more reliability scores. The device may selectively perform the object recognition operation based on whether the result of the object recognition operation is likely to satisfy the threshold.

A non-transitory computer-readable medium may store one or more instructions that, when executed by one or more processors, cause the one or more processors to receive a set of images for an object recognition operation. The object recognition operation may identify one or more objects in the set of images after the set of images are combined into a stitched image. The one or more instructions, when executed by the one or more processors, may cause the one or more processors to combine the set of images into the stitched image. The one or more instructions, when executed by the one or more processors, may cause the one or more processors to determine one or more reliability scores for the set of images. The one or more reliability scores may be determined based on a difference at corresponding points of two or more images of the set of images, and the one or more reliability scores may reflect a quality of a stitched image that includes an image, of the set of images, to which the one or more reliability scores corresponds. The one or more instructions, when executed by the one or more processors, may cause the one or more processors to determine that the object recognition operation is likely to satisfy a threshold based on the one or more reliability scores. The one or more instructions, when executed by the one or more processors, may cause the one or more processors to perform the object recognition operation based on the object recognition operation being likely to satisfy the threshold.

A method may include receiving a stitched image for an object recognition operation. The stitched image may include a set of images. The object recognition operation may identify one or more objects in the stitched image. The method may include obtaining the set of images. The method may include determining one or more reliability scores for the set of images. The one or more reliability scores may be determined based on a difference at corresponding points of two or more images of the set of images. The one or more reliability scores may correspond to a quality of the stitched image that includes an image, of the set of images, to which the one or more reliability scores correspond. The method may include determining that a result of the object recognition operation is likely to satisfy a threshold based on the one or more reliability scores. The method may include performing the object recognition operation based on the result of the object recognition operation being likely to satisfy the threshold.

BRIEF DESCRIPTION OF THE DRAWINGS

FIG. 4 is a flow chart of an example process for determining whether to perform an object recognition operation on a composite image;

FIGS. 7A-7D are diagrams of an example implementation relating to the example process shown in FIG. 6.

DETAILED DESCRIPTION

The following detailed description of example implementations refers to the accompanying drawings. The same reference numbers in different drawings may identify the same or similar elements.

An image capture device (e.g., a camera, an image sensor, etc.) may capture a set of images. Some images, of the set of images, may share an overlapped area. For example, the set of images may be arranged in a grid, and adjacent images in the grid may overlap each other. The image capture device, or an image processing device, may combine, or stitch, the set of images into a single, stitched image. For example, the image capture device may locate common elements in overlaps between two images, may project the two images onto a common plane, and may align the common elements to overlap the images into a stitched image.

In some cases, the image processing device may analyze the stitched image to identify objects in the stitched image. For example, the image processing device may identify inventory products in a stitched image of a store shelf, may identify identities of persons in a stitched image of a crowd, may identify cars in a stitched image of a parking lot, or the like. The image processing device may require a stitched image of a particular quality to identify the objects. For example, the image processing device may require a particular resolution of the stitched image, may require a stitched image that is not blurry, or the like. However, determining whether the stitched image is of the particular quality may be difficult for a user of the image capture device.

Implementations described herein enable the image processing device to predict a result of the object recognition operation based on reliability scores for the set of images. Based on the reliability scores, the image processing device or another device (e.g., a client device, based on a user input) may determine whether to proceed with the object recognition operation. In this way, the image processing device conserves processor and memory resources and improves accuracy of object recognition, which saves time and money for the organization implementing the object recognition operation.

Figure 1A:
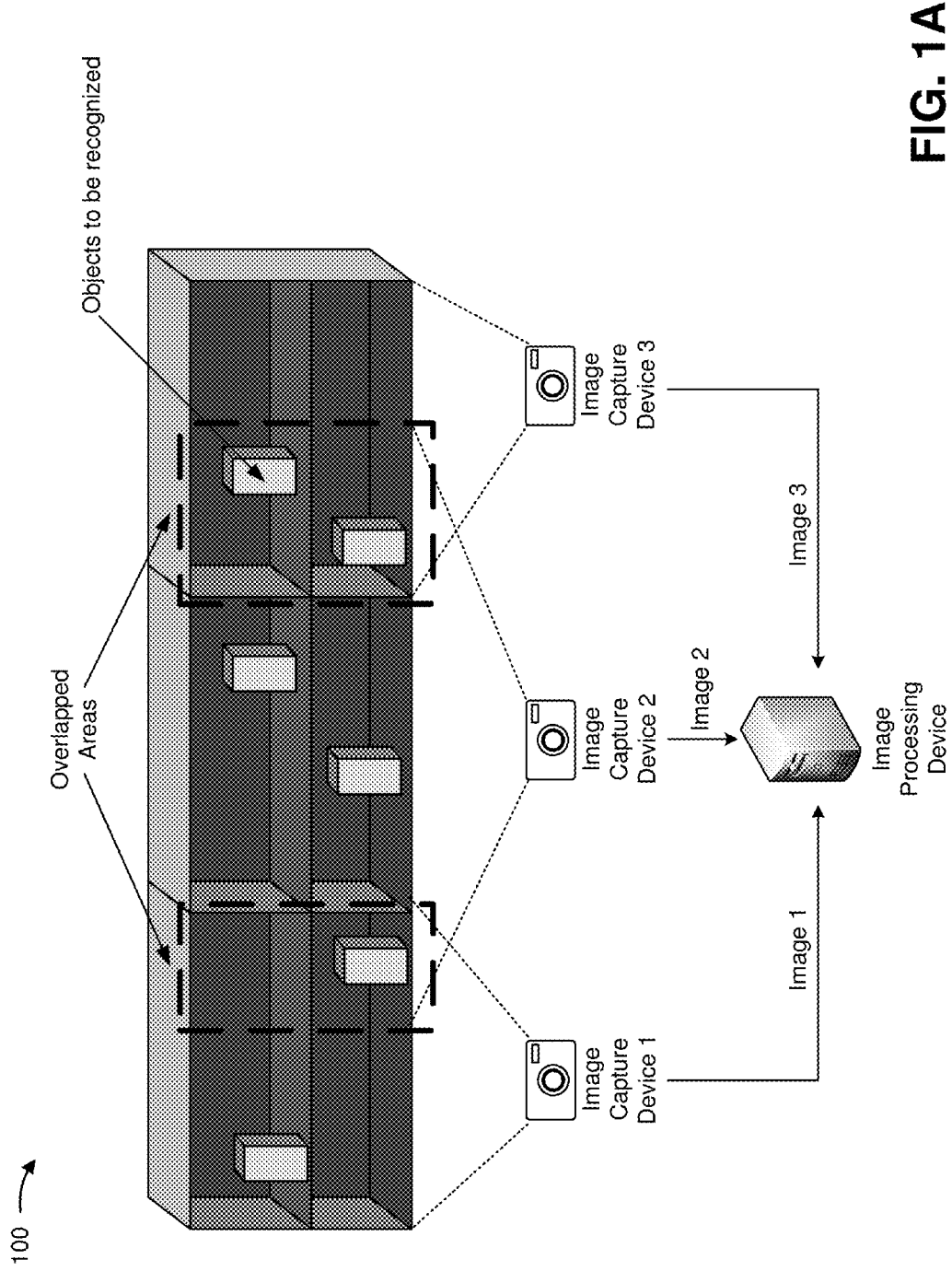
FIGS. 1A and 1B are diagrams of an overview of an example implementation described herein.
Figure 1B:
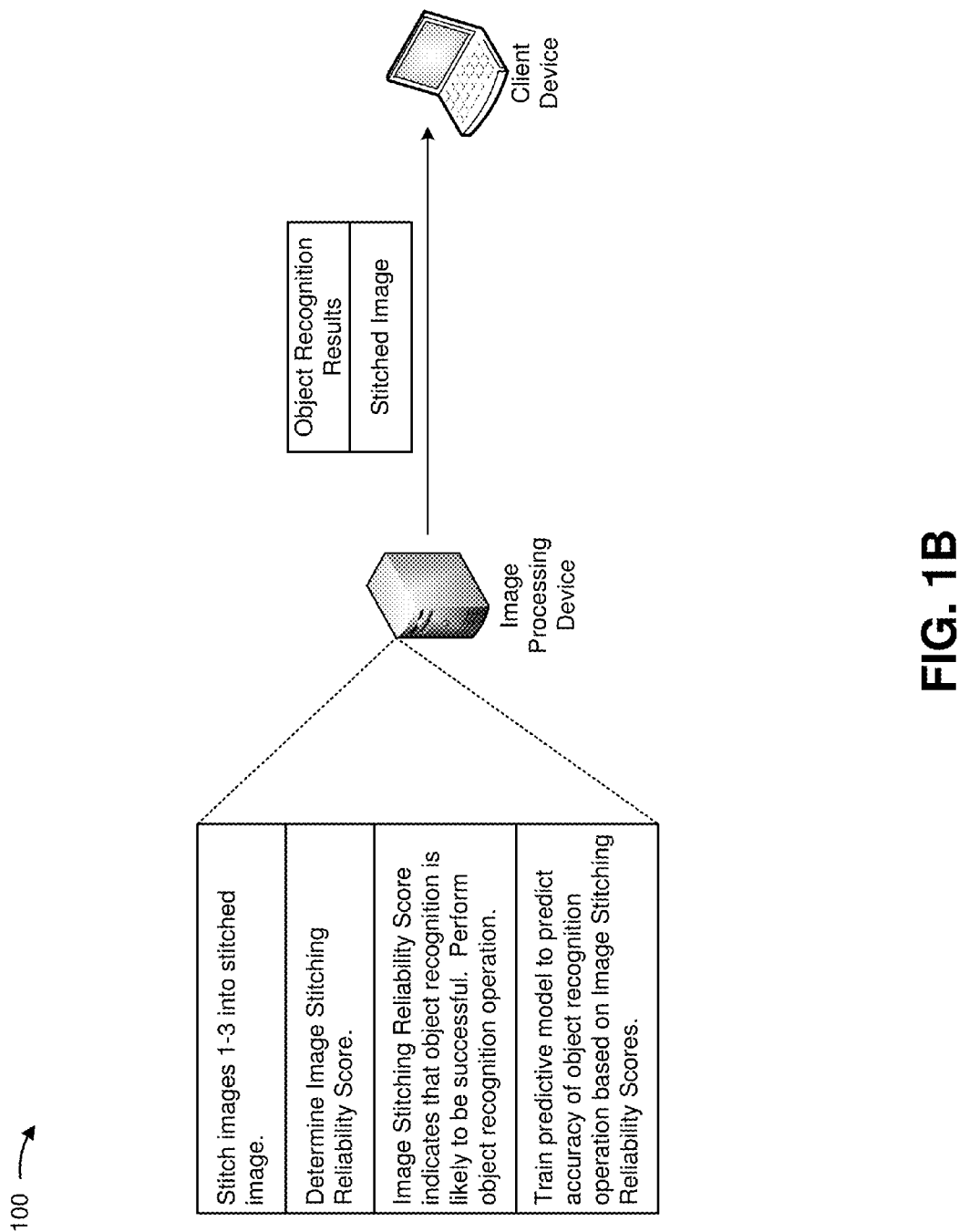

FIGS. 1A and 1B are diagrams of an overview of an example implementation 100 described herein. As shown in FIG. 1A, a set of image capture devices (e.g., image capture device 1, image capture device 2, and image capture device 3) may capture images of objects on a shelf. As further shown, the images captured by the set of image capture devices may share some overlap. Here, image 1 and image 2 share an overlap that includes one object, and image 2 and image 3 share an overlap that includes two objects. As further shown, image capture device 1, image capture device 2, and image capture device 3 may provide image 1, image 2, and image 3 to an image processing device.

As shown in FIG. 1B, the image processing device may stitch image 1, image 2, and image 3 into a stitched image. Assume that the stitched image shows each of the products captured in image 1, image 2, and image 3. As further shown, the image processing device may determine reliability scores for each of image 1, image 2, and image 3. The image processing device may determine the reliability scores based on differences between images in the overlapped areas of the images. For example, the image processing device may determine a reliability score for image 1 based on differences between image 1 and image 2 with regard to the overlapped area between image 1 and image 2. As another example, the image processing device may determine a reliability score for image 2 based on differences between image 1 and image 2 with regard to the overlapped area between image 1 and image 2, and based on differences between image 2 and image 3 with regard to the overlapped area between image 2 and image 3.

As further shown, based on the reliability scores for images 1, 2, and 3, the image processing device may determine that an object recognition operation is likely to be successful (e.g., likely to identify a threshold quantity of objects, likely to identify a threshold ratio of objects included in the stitched image, etc.) for the stitched image. As shown, the image processing device may determine that the object recognition operation is likely to be successful based on a predictive model. The predictive model may output a predicted likelihood that the object recognition operation is likely to be successful based on an input of a set of reliability scores, and may be trained based on known results of object recognition operations and past reliability scores.

As shown, the image processing device may provide object recognition results and the stitched image to a client device. As further shown, the image processing device 210 may update the predictive model based on the object recognition results and based on the reliability scores to improve the predictive model. In this way, the image processing device predicts whether the object recognition operation is likely to be successful, which conserves processor and memory resources and improves accuracy of object recognition by performing the objection recognition operation in situations where the object recognition operation is predicted to be successful and not performing the objection recognition operation otherwise.

Figure 2:
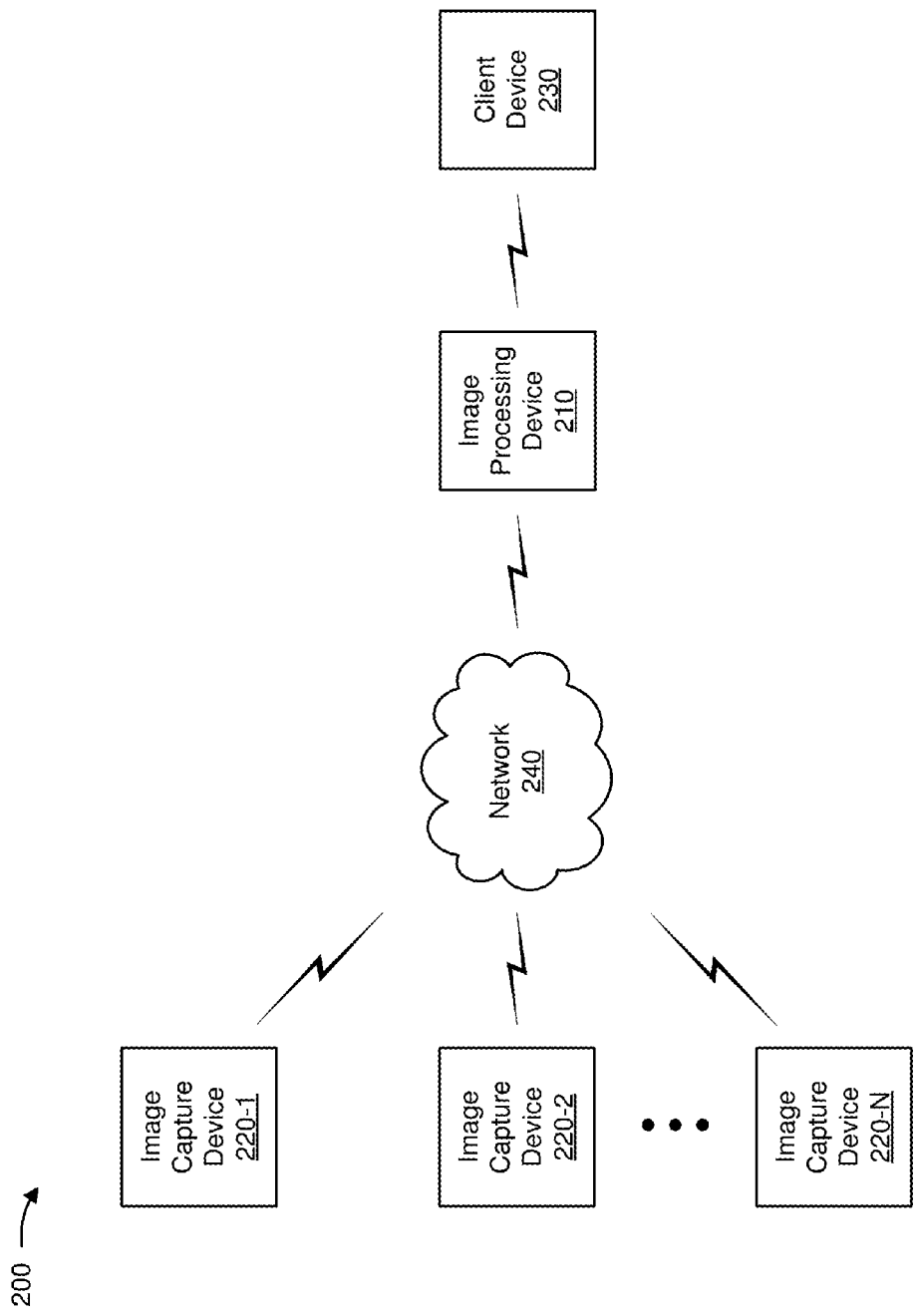
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an image processing device 210, one or more image capture devices 220-1 through 220-N (N≥1) (hereinafter referred to collectively as "image capture devices 220," and individually as "image capture device 220"), a client device 230, and a network 240. Devices of environment 200 may interconnect via wired connections, wireless connections, or a combination of wired and wireless connections.

Image processing device 210 may include a device capable of receiving, storing, generating, processing, and/or providing information. For example, image processing device 210 may include a computing device (e.g., a desktop computer, a laptop computer, a tablet computer, a handheld computer, etc.), a server, a device in a cloud computing network, or a similar device. In some implementations, image processing device 210 may include a communication interface that allows image processing device 210 to receive information from and/or transmit information to image capture device 220, client device 230, or another device.

Image capture device 220 may include a device capable of capturing an image (e.g., a photograph, a digital picture, a video, etc.). For example, image capture device 220 may include a camera (e.g., a digital camera, a web camera, etc.), a video camera (e.g., a camcorder, a movie camera), a smart camera, a mobile telephone (e.g., a smartphone, a cellular telephone, etc.) a computing device (e.g., a desktop computer, a laptop computer, a tablet computer, a handheld computer, etc.), or a similar device. In some implementations, image capture device 220 may combine a set of captured images into a stitched image. In some implementations, image capture device 220 may receive information from and/or transmit information to image processing device 210 (e.g., captured images, a stitched image, information associated with captured images, etc.).

Client device 230 may include one or more devices capable of receiving, generating, storing, processing, and/or providing information. For example, client device 230 may include a communication and/or computing device, such as a mobile phone (e.g., a smart phone, etc.), a laptop computer, a tablet computer, a handheld computer, a wearable communication device (e.g., a smart wristwatch, a pair of smart eyeglasses, etc.), or a similar type of device. In some implementations, client device 230 may receive information from and/or transmit information to another device in environment 200.

Network 240 may include one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
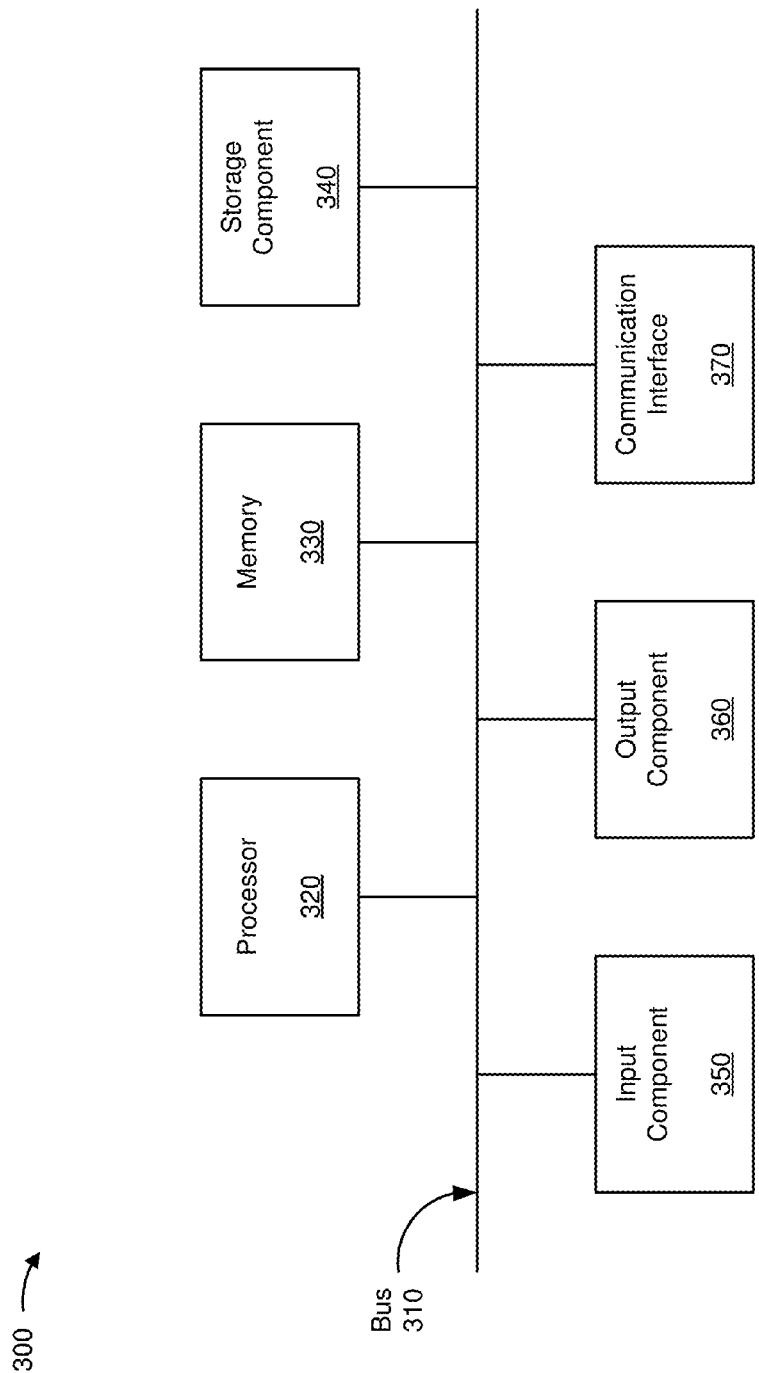
FIG. 3 is a diagram of example components of one or more devices of FIG. 2.

FIG. 3 is a diagram of example components of a device 300. Device 300 may correspond to image processing device 210, image capture device 220, and/or client device 230. In some implementations, image processing device 210, image capture device 220, and/or client device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for determining whether to perform an object recognition operation on a stitched image. In some implementations, one or more process blocks of FIG. 4 may be performed by image processing device 210. In some implementations, one or more process blocks of FIG. 4 may be performed by another device or a group of devices separate from or including image processing device 210, such as image capture device 220 and client device 230.

As shown in FIG. 4, process 400 may include obtaining a set of images, including objects to be recognized, with one or more overlaps between images of the set of images (block 410). For example, image processing device 210 may obtain a set of images that include one or more objects to be recognized. The set of images may be arranged in a grid, a row, or the like, with areas of overlap between adjacent images in the grid, row, or the like. Image processing device 210 may obtain the set of images from one or more image capture devices 220. For example, a particular image capture device 220 may capture the set of images, and may provide the set of images to image processing device 210. As another example, a set of image capture devices 220 may each capture one or more images, of the set of images, and may collectively provide the set of images to image processing device 210.

As further shown in FIG. 4, process 400 may include combining the set of images into a stitched image (block 420). For example, image processing device 210 may combine the set of images into a stitched image. In some implementations, image processing device 210 may receive a stitched image from image capture device 220. For example, image capture device 220 may capture the set of images, may combine the set of images into a single, stitched image, and may provide the stitched image to image processing device 210. In some implementations, image processing device 210 may receive additional information from image capture device 220 (e.g., an orientation of image capture device 220, a position of each image in the set of images, a relative position of each image in the set of images relative to each other image in the set of images, etc.), and may combine the set of images based on the additional information.

In some implementations, image processing device 210 may combine the set of images based on common features in overlapped areas. For example, image processing device 210 may detect common features in an overlapped area between a first image and a second image, and may combine the first image and the second image by aligning the common features. In some implementations, image processing device 210 may blend features of a first image and a second image. For example, image processing device 210 may determine luminosity values of an overlapped area in a first image and a second image, and may blend the luminosity values of the overlapped area to make the luminosity of the overlapped area uniform, as described in more detail in connection with FIG. 6, below.

In some implementations, image processing device 210 may project the set of images onto a particular plane based on homography matrices. For example, a set of images may include images that are captured at different orientations, different locations, or the like. Image processing device 210 may determine homography matrices corresponding to one or more images, of the set of images, based on the orientations, based on common features of the images, or the like. Based on parameters of the homography matrices, image processing device 210 may project the set of images onto a particular plane.

In some implementations, a homography matrix may include particular parameters. For example, the homography matrix may include the following parameters, as shown in Table 1:

TABLE 1

| | |
|---|---|
| $H_{11}$ | A scale factor in the x-direction with a constant scale factor in the y-direction |
| $H_{12}$ | A shear factor in the x-direction, proportionate to a distance from the origin in the y-direction |
| $H_{13}$ | A translation in the x-direction |
| $H_{21}$ | A scale factor in the y-direction with a constant scale factor in the x-direction |
| $H_{22}$ | A shear factor in the y-direction, proportionate to a distance from the origin in the x-direction |
| $H_{23}$ | A translation in the y-direction |
| $H_{31}$ | A shear factor when a projected location of X is dependent on both X and Y |
| $H_{32}$ | A shear factor when a projected location of Y is dependent on both X and Y |
| $H_{33}$ | 1 |

Image processing device 210 may project an image onto a projected plane by translating x-values and y-values in an original plane to X-values and Y-values in the projected plane based on the above parameters and based on the below equations:

$$X = \frac{(H_{11}*x + H_{12}*y + H_{13})}{(H_{31}*x + H_{32}*y + H_{33})}, \text{ and } Y = \frac{(H_{21}*x + H_{22}*y + H_{23})}{(H_{31}*x + H_{32}*y + H_{33})}.$$

In some implementations, image processing device 210 may estimate the parameters based on the set of images. For example, image processing device 210 may detect common features in overlapped areas and may estimate the parameters based on the common features. As another example, image processing device 210 may obtain camera information identifying tilt, orientation, magnification, or the like, for image capture device 220, and may determine the homography matrices based on the camera information.

As further shown in FIG. 4, process 400 may include determining one or more reliability scores for the set of images of the stitched image (block 430). For example, image processing device 210 may determine reliability scores for the set of images. A reliability score for a particular image may indicate an expected quality of a stitched image that includes the particular image. For example, if an overlapped area of a first image differs in shared features, resolution, lighting, or the like, from a corresponding overlapped area of a second image, the reliability score for the first image may be relatively low (e.g., relative to if the overlapped area shared the features, resolution, lighting, or the like). As another example, if an overlapped area of a first image shares a threshold quantity of features with a corresponding overlapped area of a second image, the reliability score for the first image may be relatively high (e.g., relative to if the overlapped area does not share the threshold quantity of features). A more detailed description of determining a reliability score is provided, with reference to FIG. 6, below.

As further shown in FIG. 4, process 400 may include determining that an object recognition operation is likely to be successful based on a predictive model and based on the reliability scores (block 440). For example, image processing device 210 may determine that an object recognition operation for the stitched image is likely to be successful for the stitched image. Image processing device 210 may determine that an object recognition operation is successful when a threshold ratio of identified objects to unidentified objects is satisfied, when a threshold quantity of objects is recognized, or the like.

Image processing device 210 may determine whether the object recognition operation is likely to be successful based on a predictive model. For example, image processing device 210 may obtain (e.g., receive, train, etc.) a predictive model that predicts outcomes of object recognition operations based on reliability scores. Image processing device 210 may input, to the predictive model, a set of reliability scores (e.g., a mean of the set, a median of the set, a mode of the set, a weighted average of the set, a subset of the set, a range of the set, a first quartile value of the set, a second quartile value of the set, a third quartile value of the set, a standard deviation of the set, a variance of the set, etc.) for the images included in the stitched image, and may output a predicted outcome of an object recognition operation. For example, the predictive model may output a predicted ratio of identified objects to unidentified objects, a predicted quantity of objects identified, a binary result (e.g., pass/fail, perform/do not perform, good/bad, etc.), or the like.

In some implementations, image processing device 210 may train the predictive model. For example, image processing device 210 may obtain training data (e.g., known reliability scores and known results of object recognition operations corresponding to the known reliability scores). Image processing device 210 may analyze the training data to determine a set of rules for predicting a result of an object recognition operation based on one or more reliability scores.

As further shown in FIG. 4, process 400 may include performing the object recognition operation on the stitched image (block 450). For example, image processing device 210 may perform the object recognition operation on the stitched image based on determining that the object recognition operation is likely to be successful (e.g., based on the output of the predictive model, etc.). In some implementations, image processing device 210 may cause another device to perform the object recognition operation. For example, another device (e.g., image capture device 220, client device 230, a device not shown in FIG. 2, etc.) may store the stitched image, and may perform the object recognition operation on the stitched image. In some implementations, image processing device 210 may provide information to another device. For example, image processing device 210 may provide the stitched image and/or a result of the object recognition operation to client device 210, or another device.

In some implementations, image processing device 210 may selectively perform the object recognition operation based on whether the result of the object recognition operation is likely to satisfy a threshold. For example, image processing device 210 may use the predictive model to determine a likelihood that a result of the object recognition operation is likely to satisfy a threshold based on reliability scores of the set of images. When the result of the object recognition operation is likely to satisfy a threshold quantity of object identified, a threshold ratio of objects identified, or the like, image processing device 210 may perform the object recognition operation. When the result of the object recognition operation is not likely to satisfy the threshold, image processing device 210 may not perform the object recognition operation. In such cases, image processing device 210 may provide information to another device. For example, image processing device 210 may notify image capture device 220 and/or client device 230 that the object recognition operation is not likely to be successful, may cause image capture device 220 to capture additional images of one or more of the objects included in the stitched image, or the like.

As further shown in FIG. 4, process 400 may include updating the predictive model to predict whether the object recognition operation is likely to be successful based on a result of performing the object recognition operation (block 460). For example, in situations where image processing device 210, or another device, performs the object recognition operation, image processing device 210 may update the predictive model based on a result of performing the object recognition operation. In some implementations, image processing device 210 may compare the output of the predictive model to the result of performing the object recognition operation, and may modify parameters or rules of the predictive model based on a difference between the output and the result. In this way, image processing device 210 updates a predictive model to predict the result of performing the object recognition operation, which conserves processor and memory resources by reducing a quantity of unnecessary object recognition operations performed.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
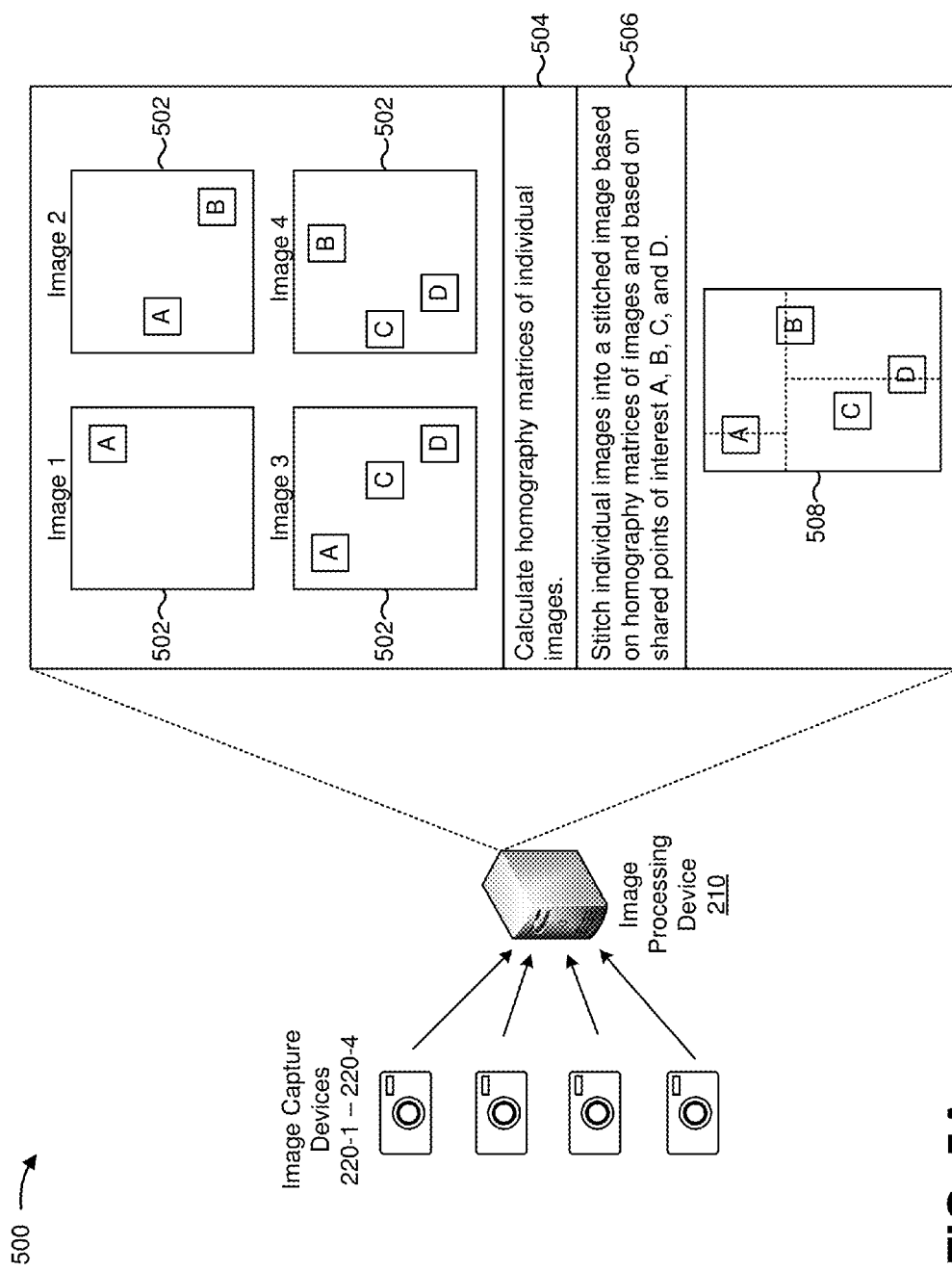
FIGS. 5A and 5B are diagrams of an example implementation relating to the example process shown in FIG. 4.
Figure 5B:
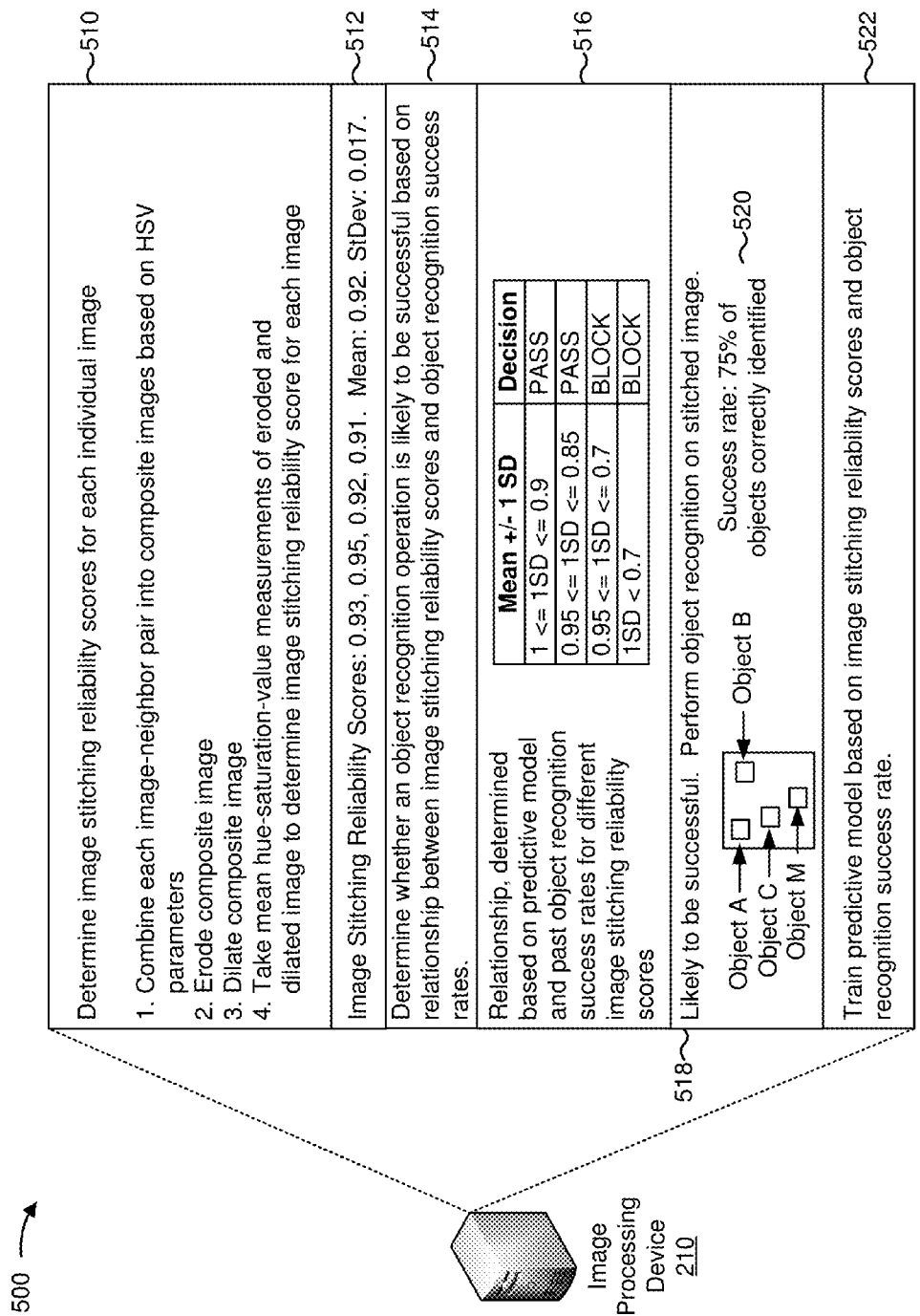

FIGS. 5A and 5B are diagrams of an example implementation 500 relating to example process 400 shown in FIG. 4. FIGS. 5A and 5B show an example of determining whether to perform object recognition on a stitched image.

As shown in FIG. 5A, and by reference number 502, image processing device 210 may receive four images from image capture devices 220-1 through 220-4. As further shown, the four images overlap in some overlapped areas. Here, image 1, image 2, and image 3 show object A, image 2 and image 4 show object B, image 3 and image 4 show object C, and image 3 and image 4 show object D. As shown by reference number 504, image processing device 210 may calculate homography matrices for the four images. In some implementations, image processing device 210 may determine the homography matrices based on shared objects A, B, C, and D. Additionally, or alternatively, image processing device 210 may determine the homography information based on camera information from image capture devices 220-1 through 220-4.

As shown by reference number 506, image capture device 220 may stitch the four images into a stitched image based on the homography matrices of the four images and based on objects A, B, C, and D in the overlapped areas. For example, image processing device 210 may project the four images onto a common plane, and may align the four images based on the objects in the overlapped area, as shown by reference number 508.

As shown in FIG. 5B, and by reference number 510, image processing device 210 may determine reliability scores corresponding to each image, of the four images. For example, in one possible implementation, image processing device 210 may combine each image with each neighboring image (i.e., image 1/image 2, image 1/image 3, image 1/image 4, image 2/image 3, image 2/image 4, and image 3/image 4), and may determine reliability scores for each pair of images.

As shown, to determine the reliability scores, image processing device 210 may combine each image/neighbor pair into composite images based on hue, saturation, and/or value parameters of the pair of images. As shown, image processing device 210 may erode the composite image to eliminate shared details and may dilate the eroded composite image to magnify differences between the pair of images, which may be shown in the eroded composite image. As further shown, image processing device 210 may take mean hue-saturation-value measurements of the eroded and dilated composite images to determine a reliability score for images 1-4. For example, image processing device 210 may take a mean hue parameter value of a set of points in a particular composite image, a mean saturation parameter value of the set of points in the particular composite image, and a mean value parameter value of the set of points in the particular composite image. The reliability score for the particular composite image, in some implementations, may be determined based on a mean of the mean hue, mean saturation, and mean value parameter values for the particular composite image. A more detailed description of determining reliability scores is provided, with reference to FIG. 6, below. In some implementations, image processing device 210 may generate a composite image based on a proper subset of a set of images (e.g., based on images 1 and 2, based on images 1, 2, and 3, based on images 1, 2, and 4, based on images 1, 3, and 4, based on images 2, 3, and 4, etc.). In some implementations, image processing device 210 may generate a composite image based on a set of images.

As shown by reference number 512, image processing device 210 may determine reliability scores of 0.93, 0.95, 0.92, and 0.91 for the four images. In this example, reliability scores range between values of 0 and 1, and a reliability score that is closer to 1 indicates that an image is likely to produce a more reliable stitched image than an image with a reliability score that is closer to 0. As further shown, image processing device 210 determines a mean value of the reliability scores (e.g., 0.92), and a standard deviation of the reliability scores (e.g., 0.017).

As shown by reference number 514, image processing device 210 may determine whether an object recognition operation is likely to be successful based on a relationship between reliability scores and object recognition success rates. As shown by reference number 516, the relationship between the reliability scores and the object recognition success rates may be determined based on a predictive model. The predictive model may be trained based on past object recognition success rates as compared with reliability scores corresponding to the past object recognition success rates.

As further shown, image processing device 210 may determine whether the object recognition operation is likely to be successful based on the mean of the four reliability scores, plus or minus one standard deviation. Here, image processing device 210 determines to perform the object recognition operation (e.g., as shown by PASS) when the mean plus or minus one standard deviation is between 1 and 0.9, and when the mean plus or minus one standard deviation is between 0.95 and 0.85. As further shown, image processing device 210 determines not to perform the object recognition operation (e.g., as shown by BLOCK) when the mean plus or minus one standard deviation is between 0.95 and 0.7, and when the mean plus or minus one standard deviation is below 0.7.

As shown by reference number 518, here, image processing device 210 determines that the object recognition operation is likely to be successful (e.g., based on the mean of the four reliability scores being equal to 0.92, and the standard deviation being equal to 0.017). As further shown, image processing device 210 performs the object recognition operation on the stitched image. Here, image processing device 210 correctly identifies object A, object B, and object C. As shown, image processing device 210 incorrectly identifies object D as a different object (object M). As shown by reference number 520, image processing device 210 determines an object recognition success rate of 75%. As shown by reference number 522, image processing device 210 updates the predictive model based on the reliability scores and the object recognition success rate. In this way, image processing device 210 determines whether to proceed with the objection recognition operation based on the reliability scores of the set of images, which conserves processor power that may be used for unsuccessful object recognition operations and improves accuracy of object recognition operations.

As indicated above, FIGS. 5A and 5B are provided merely as an example. Other examples are possible and may differ from what was described with regard to FIGS. 5A and 5B.

Figure 6:
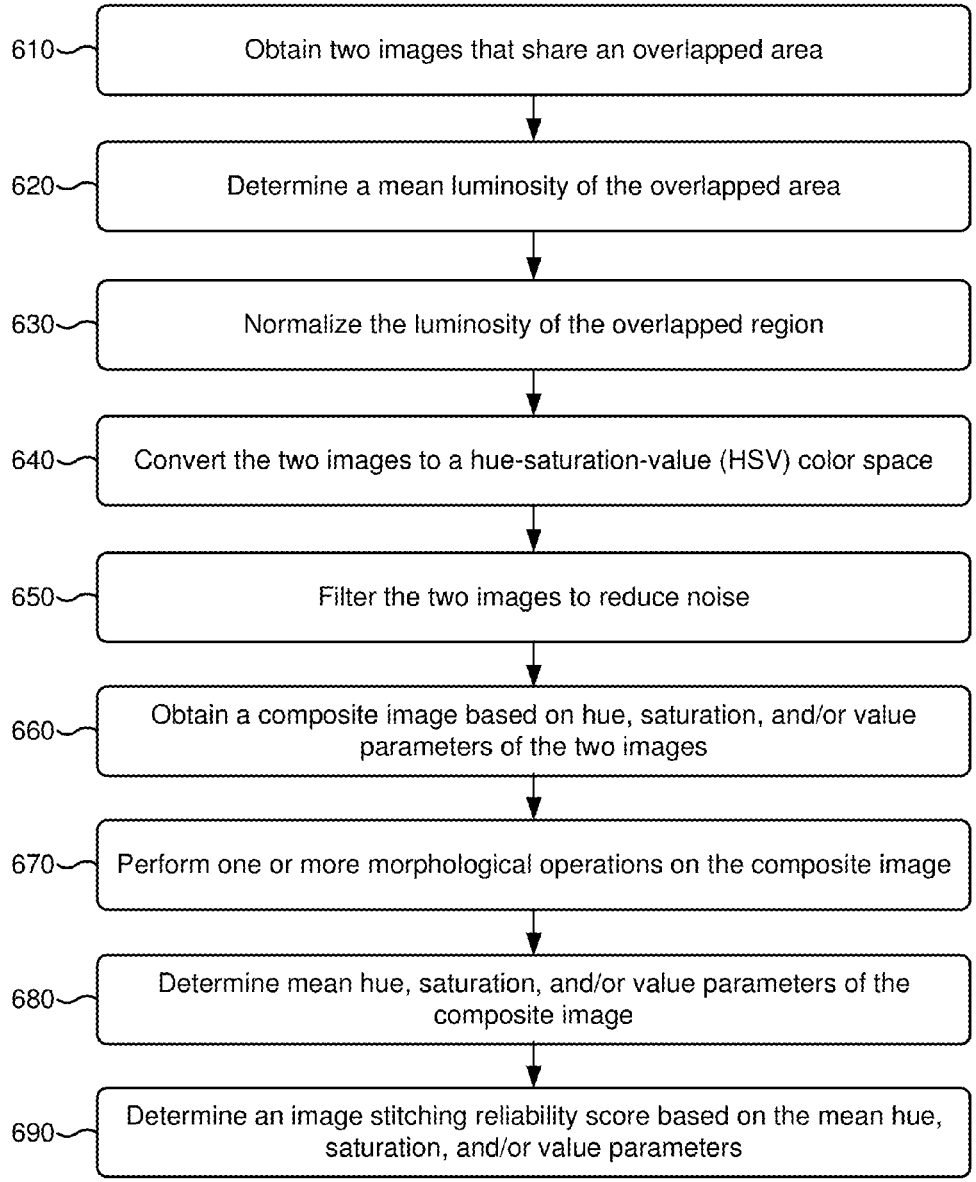
FIG. 6 is a flow chart of an example process for determining a reliability score.

FIG. 6 is a flow chart of an example process 600 for determining a reliability score. In some implementations, one or more process blocks of FIG. 6 may be performed by image processing device 210. In some implementations, one or more process blocks of FIG. 6 may be performed by another device or a group of devices separate from or including image processing device 210, such as image capture device 220 and client device 230.

As shown in FIG. 6, process 600 may include obtaining two images that share an overlapped area (block 610). For example, image processing device 210 may obtain two or more images from image capture device 220. Two images, of the two or more images, may share an overlapped area. For example, a portion of a first image may depict the same object as a corresponding portion of a second image. In some implementations, image processing device 210 may determine that the images share the overlapped area. For example, image processing device 210 may detect shared features in the overlapped area, may determine that the two images are adjacent in a grid of images, or the like. In some implementations, image processing device 210 may receive a stitched image, and may determine reliability scores for two or more images that are included in the stitched image. In such a case, image processing device 210 may obtain the stitched image from image capture device 220, client device 230, or the like.

As further shown in FIG. 6, process 600 may include determining a mean luminosity of the overlapped area (block 620). For example, image processing device 210 may determine a mean luminosity of the overlapped area in each of the two images. Image processing device 210 may determine the mean luminosity by determining a mean luminosity value of each pixel in the overlapped area, by determining a mean luminosity value of portions of the overlapped area, or the like. Image processing device 210 may determine the mean luminosity value to improve a quality of the composite image. For example, image processing device 210 may modify the luminosity of the two images, in the overlapped area, to match the luminosities, as described in more detail below.

As further shown in FIG. 6, process 600 may include normalizing the luminosity of the overlapped region (block 630). For example, image processing device 210 may normalize the luminosity of the overlapped area of the two images. In some implementations, image processing device 210 may determine a normalized luminosity by taking a mean value of the mean luminosities of the two images. Additionally, or alternatively, image processing device 210 may apply a function to determine the normalized luminosity. For example, image processing device 210 may blend the normalized luminosity of the overlapped area from a mean luminosity value of a first image to a mean luminosity value of a second image. In this way, image processing device 210 prevents inconsistencies in luminosity from appearing in between images in the composite image.

As further shown in FIG. 6, process 600 may include converting the two images to a hue-saturation-value (HSV) color space (block 640). For example, when image processing device 210 receives the two images, the two images may be in a red-green-blue (RGB) color space. Image processing device 210 may convert the two images to a cylindrical-coordinate color model, such as an HSV color space. By converting the two images to the HSV color space, image processing device 210 may improve efficiency of processing the two images and thus conserve processor resources. In some implementations, image processing device 210 may convert the two images to another color space, such as a hue-saturation-intensity color space, a hue-saturation-lightness color space, or the like. In some implementations, another device, such as image capture device 220, may convert the two images to the HSV color space, and may provide the converted images to image processing device 210. In some implementations, color parameters (e.g., hue parameters, saturation parameters, value parameters, lightness parameters, intensity parameters, etc.) may include values between zero and one.

As further shown in FIG. 6, process 600 may include filtering the two images to reduce noise (block 650). For example, image processing device 210 may filter the two images to reduce noise in the two images. By reducing noise in the two images, image processing device 210 improves accuracy of the composite image and increases reliability of object detection, thus saving an organization that implements the object detection time and money. In some implementations, image processing device 210 may perform a smoothing filtering operation, such as a box filtering operation, a Gaussian filtering operation, or the like. By performing a box filtering operation, image processing device 210 conserves processing resources as compared to a Gaussian filtering operation. By performing a Gaussian filtering operation, image processing device 210 reduces high-frequency artifacts that may be present in an image that is processed based on a box filtering operation, which improves accuracy of the composite image and thus conserves resources of the organization that implements the object detection.

As further shown in FIG. 6, process 600 may include obtaining a composite image based on hue, saturation, and/or value parameters of the two images (block 660). For example, image processing device 210 may obtain a composite image based on hue, saturation, and/or value parameters of the two images. In some implementations, image processing device 210 may obtain the composite image by combining the two images based on a hue, saturation, and/or value parameter of the two images. For example, image processing device 210 may set a hue parameter of the composite image based on a combination of hue parameters of the two images, a saturation parameter of the composite image based on a combination of saturation parameters of the two images, and a value parameter of the composite image based on a combination of value parameters of the two images. To combine the parameters, image processing device 210 may add the parameters, subtract the parameters, multiply the parameters, divide the parameters, average the parameters, or may perform another operation on the parameters.

In some implementations, image processing device 210 may set hue, saturation, and value parameters in the composite image based on a value of a particular parameter. As an example, assume that a particular pixel in a first image is associated with a value parameter of 0.28, and assume that a corresponding pixel in a second image is associated with a value parameter of 0.82. Image processing device 210 may subtract the value parameters of the particular pixels to obtain a value difference of 0.54. In some implementations, image processing device 210 may set hue, saturation, and value parameters of the resulting composite image to the value difference. For example, in the particular pixel of the composite image, (Hue, Saturation, Value) may equal [0.54 0.54 0.54].

Continuing the above example, assume that another pixel in the first image is associated with a value parameter of 0.56, and that a corresponding pixel in the second image is associated with a value parameter of 0.57. In this case, the other pixel in the composite image may be associated with a (Hue, Saturation, Value) vector of [0.01 0.01 0.01]. A lower hue/saturation/value parameter may produce a darker pixel. Therefore, the other pixel appears darker than the particular pixel in the composite image, based on the larger relative difference of the particular pixel in the first image and the second image. In this way, image processing device 210 generates a composite image that identifies differences in value between the two images using a lightness of a pixel in the composite image, which aids in identifying images that may generate a poorly stitched image when combined.

As further shown in FIG. 6, process 600 may include performing one or more morphological operations on the composite image (block 670). For example, image processing device 210 may perform one or more morphological operations on the composite image. Image processing device 210 may perform morphological operations to remove overlapped details and/or to strengthen non-overlapped details. For example, when the composite image includes a lighter area corresponding to a greater difference between the two images, image processing device 210 may perform a morphological operation to increase a size and/or brightness of the lighter area. Additionally, or alternatively, when the composite image includes a dark area corresponding to a lesser difference between the two images, image processing device 210 may perform a morphological operation to decrease a size and/or brightness of the darker area.

In some implementations, the morphological operation may include erosion. For example, image processing device 210 may erode the composite image one or more times to eliminate small details, corresponding to lesser differences between the two images. In some implementations, the morphological operation may include dilation. For example, image processing device 210 may dilate the composite image one or more times to magnify non-overlapped details (e.g., lighter areas corresponding to greater differences between the two images). In some implementations, image processing device 210 may erode the composite image before dilating the composite image, which may eliminate lesser differences before magnifying the remaining, greater differences. In some implementations, image processing device 210 may perform another type of morphological operation (e.g., a dilation followed by an erosion, a hit and miss transform, etc.).

As further shown in FIG. 6, process 600 may include determining mean hue, saturation, and/or value parameters of the composite image (block 680). For example, image processing device 210 may determine mean hue, saturation, and/or value parameters of the composite image. In some implementations, image processing device 210 may determine a mean hue parameter, a mean saturation parameter, and/or a mean value parameter for the composite image. Additionally, or alternatively, image processing device 210 may determine a mean of a mean hue parameter, a mean saturation parameter, and/or a mean value parameter for the composite image. For example, image processing device 210 may perform the following operation:

$$MeanC = \frac{MeanH + MeanS + MeanV}{3},$$

where MeanH is a mean hue parameter for the composite image, MeanS is a mean saturation parameter for the composite image, MeanV is a mean value parameter for the composite image, and MeanC is a mean of the hue, saturation, and value parameters for the composite image.

As further shown in FIG. 6, process 600 may include determining a reliability score based on the mean hue, saturation, and/or value parameters (block 690). For example, image processing device 210 may determine a reliability score based on the mean hue, saturation, and/or value parameters.

In some implementations, image processing device 210 may determine a mean of the hue, saturation, and value parameters for the composite image, and may subtract the mean from 1. For example, a reliability score of 1 may be a highest attainable reliability score, corresponding to no difference between the two images. Image processing device 210 may determine the mean hue, saturation, and/or value parameters for the composite image, corresponding to differences between the two images, and may subtract the mean hue, saturation, and/or value parameters from 1 to determine the reliability score.

In some implementations, image processing device 210 may determine reliability scores for multiple images. For example, a stitched image may include multiple images (e.g., four images, eight images, etc.). Image processing device 210 may determine reliability scores for each of the images that are included in the stitched image. Where a particular image overlaps two or more other images, image processing device 210 may determine reliability scores for each of the overlapped areas of the particular image, and may combine the reliability scores for the overlapped areas of the particular image. For example, a reliability score may be an average of the reliability scores, may be a sum of the reliability scores, may be a weighted sum of the reliability scores, or the like, to determine a final reliability score for the particular image.

Image processing device 210 may determine whether an object recognition operation is likely to be successful for the stitched image based on the reliability scores for the images in the stitched image, as described in more detail in connection with FIG. 4, above. In this way, image processing device 210 determines reliability scores for the images included in a stitched image, based on which image processing device 210 determines whether the object recognition operation is likely to be successful. Thus, image processing device 210 conserves processor resources of image processing device 210 and/or client device 230 and organizational resources (e.g., time, money, worker hours, etc.) for an organization that implements the object recognition operation.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7D are diagrams of an example implementation 700 relating to example process 600 shown in FIG. 6. FIGS. 7A-7D show an example of determining a reliability score.

Figure 7A:
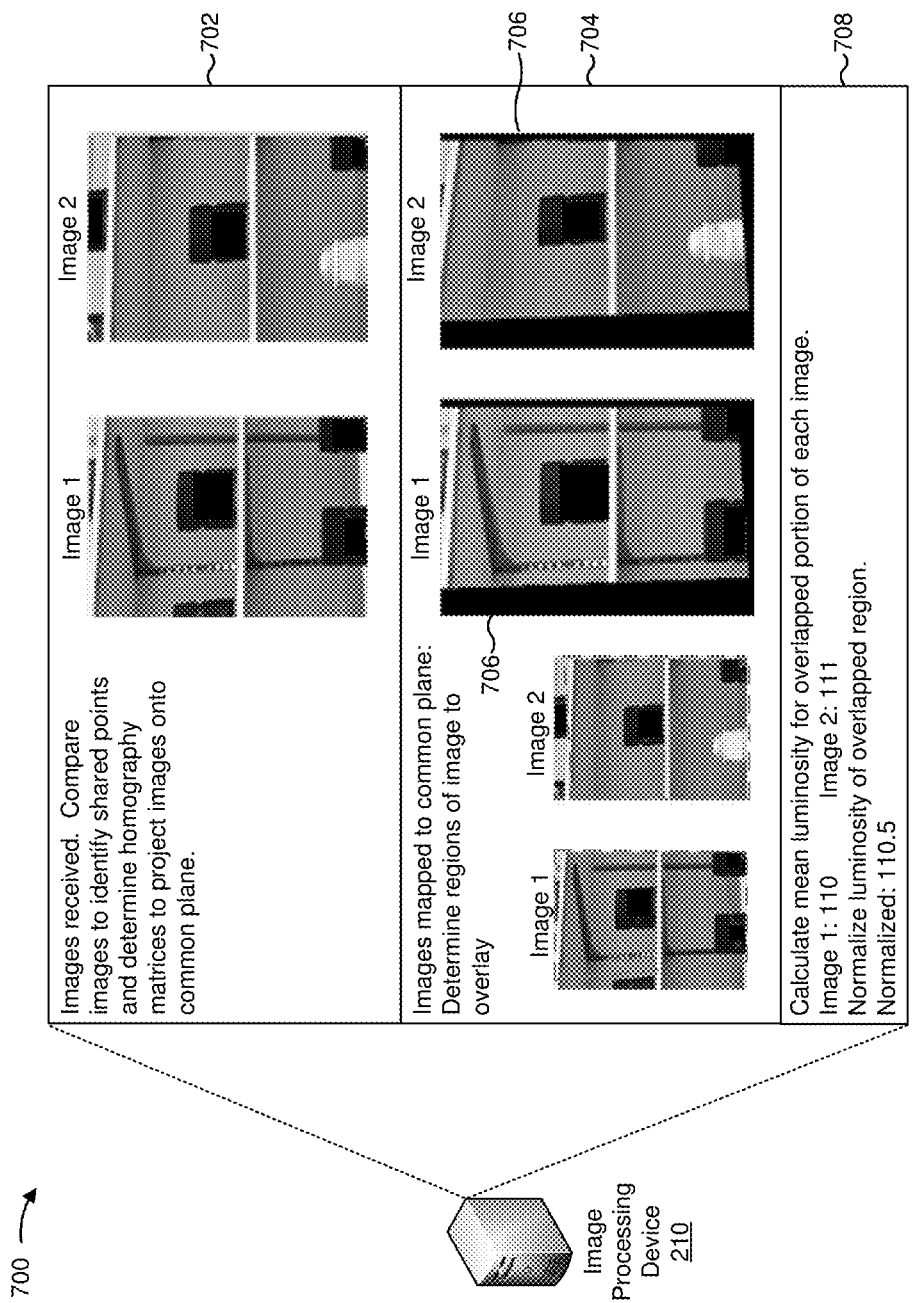

As shown in FIG. 7A, and by reference number 702, image processing device 210 may receive two images (e.g., image 1 and image 2). Assume that image processing device 210 receives the two images from image capture device 220. As further shown, image processing device 210 may compare image 1 and image 2 to identify shared points in the two images and to determine homography matrices to project image 1 and image 2 onto a common plane. Assume that image processing device 210 projects the images onto the common plane based on two homography matrices corresponding to image 1 and image 2, respectively.

As shown by reference number 704, image processing device 210 may determine parts of the images to overlay, which are indicated by areas inside the dotted lines. Here, a majority of images 1 and 2 are overlaid. Images 1 and 2, as projected to the common plane, are shown by reference number 706. As shown by reference number 708, image processing device 210 may determine a mean luminosity for the overlapped part of each image. Here, image processing device 210 determines a mean luminosity of 110 (e.g., out of 255) for image 1, and a mean luminosity of 111 for image 2. As further shown, image processing device 210 normalizes luminosity of the overlapped area. Here, image processing device 210 normalizes the luminosity based on an average value for the two images (e.g., 110.5).

Figure 7B:
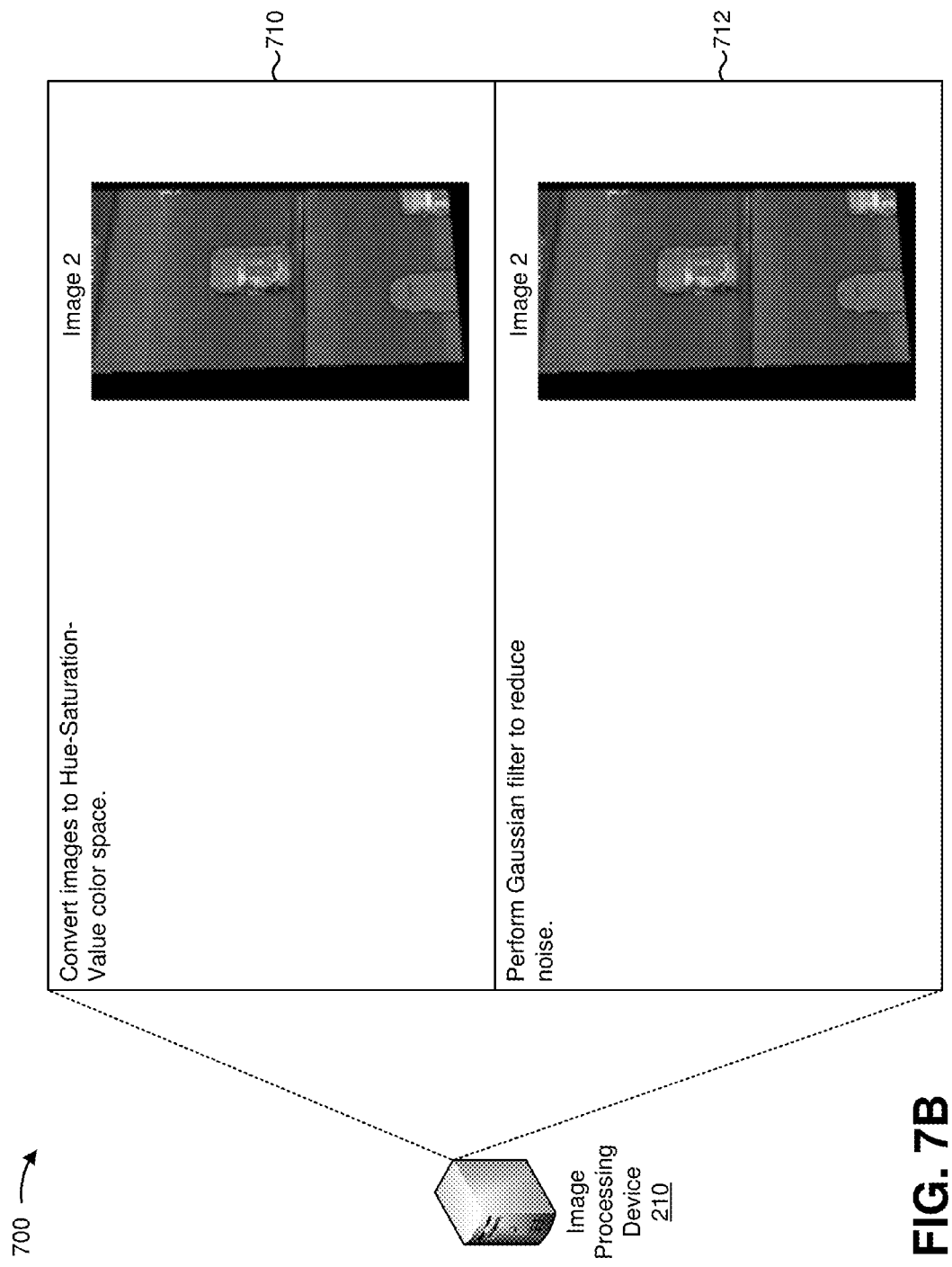

As shown in FIG. 7B, and by reference number 710, image processing device 210 may convert the images to a hue-saturation-value (HSV) color space. Here, image 2 is shown in the HSV color space. Assume that image processing device 210 converts image 1 to the HSV color space (not shown). As shown by reference number 712, image processing device 210 may perform a Gaussian filter to reduce noise in images 1 and 2. Here, image 2 is shown after applying the Gaussian filter. Assume that image processing device 210 applies the Gaussian filter to image 1 (not shown).

Figure 7C:
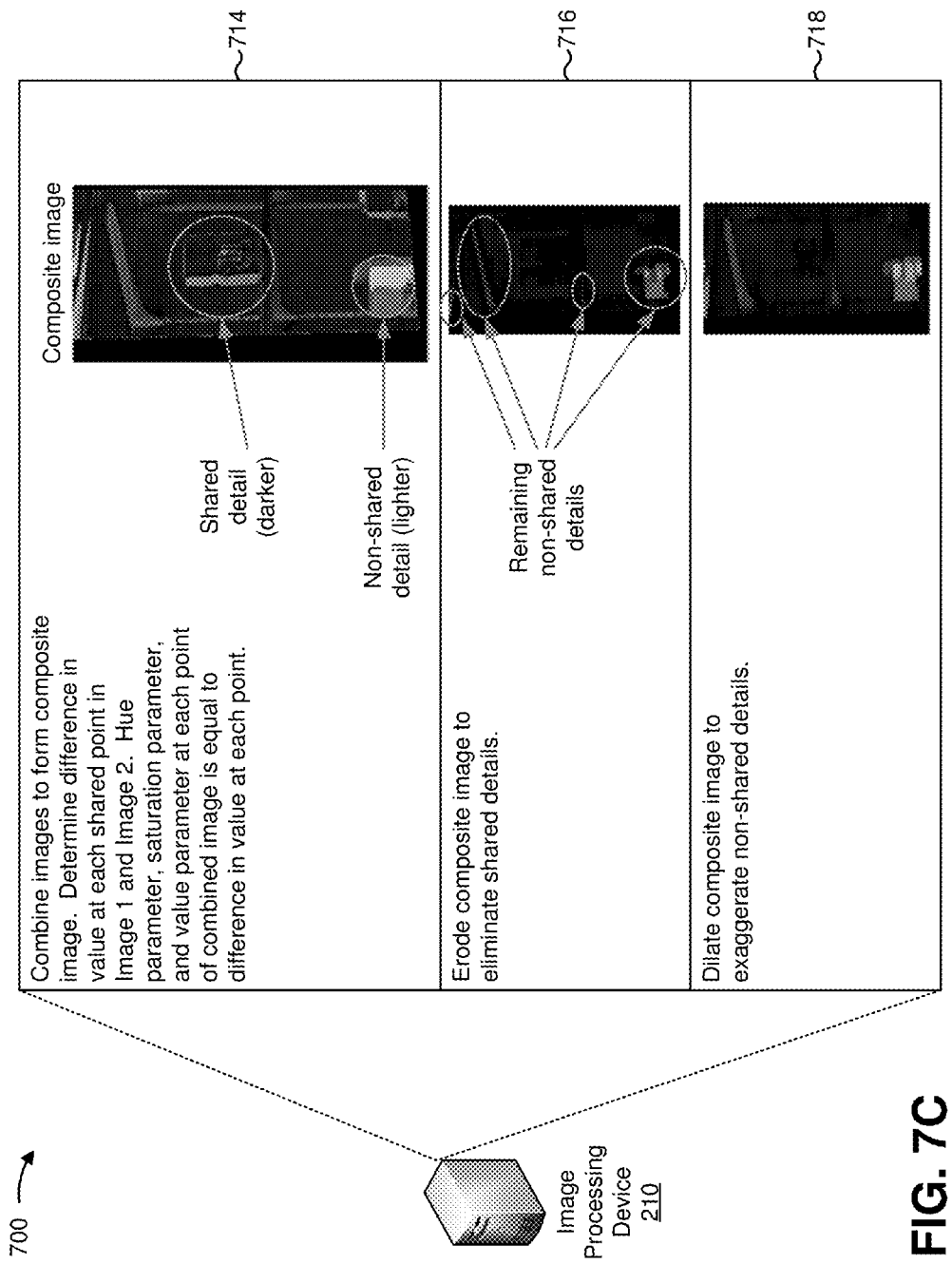

As shown in FIG. 7C, and by reference number 714, image processing device 210 may combine images 1 and 2 to generate a composite image. As shown, image processing device 210 may combine images 1 and 2 by determining a difference in a value parameter at corresponding points (e.g., pixels) in image 1 and image 2. As further shown, to generate the composite image, image processing device 210 may set a hue parameter, a saturation parameter, and a value parameter of each point in the composite image to be equal to a difference in value at the particular point of image 1 and image 2. Note that details that are not shared between image 1 and image 2 are shown at a higher value (e.g., a value closer to white), while details that are shared between image 1 and image 2 are shown at a lower value (e.g., a value closer to black).

As shown by reference number 716, image processing device 210 may erode the composite image to eliminate details from the composite image that are shared by image 1 and image 2. As shown by reference number 718, image processing device 210 may dilate the composite image after eroding the composite image to exaggerate the remaining, non-shared details (e.g., the white area at the bottom of the image, the white area near the center of the image, the white area near the top of the image, etc.).

As shown in FIG. 7D, image processing device 210 may compute mean hue (H), saturation (S), and value (V) parameters for the composite image. As further shown, assume that the mean hue (Mean H), mean saturation (Mean S), and mean value (Mean V) parameters are each equal to 0.07 for the composite image. As further shown, image processing device 210 may determine a reliability score for the image by determining a mean of the mean hue, mean saturation, and mean value parameters, and by subtracting the determined mean from 1. As shown, image processing device 210 determines that the composite image is associated with a reliability score of 0.94. Based on the composite image being associated with a reliability score of 0.94, image processing device 210 determines that image 1 and image 2 are associated with a reliability score of 0.94.

In this way, image processing device 210 determines a reliability score based on differences between image 1 and image 2, which permits image processing device 210 to predict whether an object recognition operation will be successful for a stitched image that includes image 1 and image 2. Thus, image processing device 210 conserves processor and memory resources that might otherwise be consumed for object recognition operations that are unlikely to succeed and conserves resources (e.g., time, money, worker hours, etc.) for an organization that implements the object recognition operation.

As indicated above, FIGS. 7A-7D are provided merely as an example. Other examples are possible and may differ from what was described with regard to FIGS. 7A-7D.

Implementations described herein enable an image processing device to predict a result of the object recognition operation based on reliability scores for the set of images. Based on the reliability scores, the image processing device or another device (e.g., a client device, based on a user input) may determine whether to proceed with the object recognition operation. In this way, the image processing device conserves processor and memory resources and improves accuracy of object recognition, which saves time and money for the organization implementing the object recognition operation.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device for selectively performing an object recognition operation, the device comprising:
   one or more processors to:
      receive a plurality of images for the object recognition operation;
      combine the plurality of images into a stitched image;
      determine a mean luminosity of an overlapped area of two images, of the plurality of images, that share the overlapped area;
      convert the two images to a hue-saturation-value (HSV) color space to generate two HSV color space converted images;
      obtain a composite image based on the mean luminosity of the overlapped area and based on hue, saturation, and value parameters associated with the two HSV color space converted images;
      determine a mean hue parameter, a mean saturation parameter, and a mean value parameter for the composite image;
      determine a reliability score for the two images based on the mean hue parameter, the mean saturation parameter, and the mean value parameter for the composite image,
         the reliability score predicting a quality of the stitched image that includes the two images, of the plurality of images, to which the reliability score corresponds;
      determine whether an accuracy associated with performance of the object recognition operation is likely to satisfy a threshold based on the reliability score; and
      selectively perform the object recognition operation based on whether the accuracy associated with the performance of the object recognition operation is likely to satisfy the threshold,
         the object recognition operation identifying one or more objects in the plurality of images.

2. The device of claim 1, where the one or more processors, when determining whether the accuracy associated with the performance of the object recognition operation is likely to satisfy the threshold, are to:
   determine whether the accuracy associated with the performance of the object recognition operation is likely to satisfy the threshold based on a predictive model,
      the predictive model outputting a likelihood of the accuracy associated with the performance of the object recognition operation satisfying the threshold based on the reliability score.

3. The device of claim 2, where the one or more processors are further to:
   update the predictive model based on results of performing the object recognition operation and based on the reliability score.

4. The device of claim 1, where
   the composite image is generated based on differences at corresponding points in a first image and a second image of the two images.

5. The device of claim 1, where the one or more processors are further to:
   perform at least one morphological operation on the composite image,
      the morphological operation including at least one of a first operation to erode the composite image or a second operation to dilate the composite image.

6. The device of claim 1, where the one or more processors are further to:
   perform a filtering operation on the two HSV color space converted images to reduce noise in the two HSV color space converted images,
      the filtering operation including one or more of:
         a box filtering operation, or
         a Gaussian filtering operation.

7. The device of claim 1, where the one or more processors are further to:
  determine a plurality of reliability scores corresponding to the plurality of images.

8. A non-transitory computer-readable medium storing instructions for performing an object recognition operation, the instructions comprising:
  one or more instructions that, when executed by one or more processors, cause the one or more processors to:
    receive a plurality of images for the object recognition operation;
    combine the plurality of images into a stitched image;
    determine a mean luminosity of an overlapped area of two images, of the plurality of images, that share the overlapped area;
    convert the two images to a hue-saturation-value (HSV) color space to generate two HSV color space converted images;
    obtain a composite image based on the mean luminosity of the overlapped area and based on hue, saturation, and value parameters associated with the two HSV color space converted images;
    determine a mean hue parameter, a mean saturation parameter, and a mean value parameter for the composite image;
    determine a reliability score for the two images based on the mean hue parameter, the mean saturation parameter, and the mean value parameter for the composite image,
      the reliability score reflecting a quality of the stitched image that includes the two images, of the plurality of images, to which the reliability score corresponds;
    determine that the object recognition operation is likely to satisfy a threshold based on the reliability score; and
    perform the object recognition operation based on the object recognition operation being likely to satisfy the threshold,
      the object recognition operation identifying one or more objects in the plurality of images.

9. The non-transitory computer-readable medium of claim 8, where the reliability score is included in a plurality of reliability scores corresponding to the plurality of images; and
  where the one or more instructions, that cause the one or more processors to determine that the object recognition operation is likely to satisfy the threshold, further cause the one or more processors to:
  combine the plurality of reliability scores, to generate a combined plurality of reliability scores, by determining at least one of:
    a mean of the plurality of reliability scores,
    a median of the plurality of reliability scores,
    a first quartile value of the plurality of reliability scores,
    a second quartile value of the plurality of reliability scores,
    a third quartile value of the plurality of reliability scores,
    a standard deviation of the plurality of reliability scores, or
    a variance of the plurality of reliability scores; and
  determine that the object recognition operation is likely to satisfy the threshold based on the combined plurality of reliability scores.

10. The non-transitory computer-readable medium of claim 8, where the instructions further comprise:
  one or more instructions that, when executed by the one or more processors, cause the one or more processors to:
    determine an overlapped area of a first image and a corresponding overlapped area of a second image, the two images including the first image and the second image;
    determine a first mean luminosity corresponding to the overlapped area of the first image and a second mean luminosity corresponding to the overlapped area of the second image; and
    change a luminosity of the overlapped area in the first image and the overlapped area of the second image to a third mean luminosity,
      the third mean luminosity being determined based on combining the first mean luminosity and the second mean luminosity.

11. The non-transitory computer-readable medium of claim 8, where the one or more instructions, that cause the one or more processors to combine the plurality of images, cause the one or more processors to:
  determine a plurality of homography matrices corresponding to the plurality of images,
    the plurality of homography matrices providing parameters for projecting the plurality of images onto a common plane; and
  project the plurality of images onto the common plane based on the plurality of homography matrices.

12. The non-transitory computer-readable medium of claim 8, where the instructions further comprise:
  one or more instructions that, when executed by the one or more processors, cause the one or more processors to:
    convert the plurality of images to the HSV color space.

13. The non-transitory computer-readable medium of claim 8, where
  the hue, saturation, and value parameters are combined at a plurality of corresponding points in the two images.

14. The non-transitory computer-readable medium of claim 8, where the instructions further comprise:
  one or more instructions that, when executed by the one or more processors, cause the one or more processors to:
    provide information indicating that the object recognition operation is likely to satisfy the threshold; and
    receive an instruction to perform the object recognition operation based on providing the information indicating that the object recognition operation is likely to satisfy the threshold.

15. A method for performing an object recognition operation, comprising:
  receiving, by a device, a stitched image for the object recognition operation,
    the stitched image including a plurality of images, and
    the object recognition operation identifying one or more objects in the stitched image;
  obtaining, by the device, the plurality of images;
  determining, by the device, a mean luminosity of an overlapped area of two images, of the plurality of images, that share the overlapped area;
  normalizing, by the device, the mean luminosity of the overlapped area;
  converting, by the device, the two images to a hue-saturation-value (HSV) color space to generate two HSV color space converted images;
  obtaining, by the device, a composite image based on normalizing the mean luminosity of the overlapped area and based on hue, saturation, and value parameters associated with the two HSV color space converted images;

determining, by the device, a mean hue parameter, a mean saturation parameter, and a mean value parameter for the composite image;

determining, by the device, a reliability score for the two images based on the mean hue parameter, the mean saturation parameter, and the mean value parameter for the composite image, the reliability score corresponding to a quality of the stitched image that includes the two images, of the plurality of images, to which the reliability score corresponds;

determining, by the device, that an accuracy associated with performance of the object recognition operation is likely to satisfy a threshold based on the reliability score; and performing, by the device, the object recognition operation based on the accuracy associated with the performance of the object recognition operation being likely to satisfy the threshold.

16. The method of claim 15, further comprising:
determining at least two reliability scores for a particular image of the plurality of images,
the particular image overlapping at least two other images, of the plurality of images, in the stitched image; and
combining the at least two reliability scores for the particular image to determine a final reliability score for the particular image.

17. The method of claim 15, further comprising:
identifying the one or more objects based on the object recognition operation; and
providing information identifying the one or more objects.

18. The method of claim 15, where
the composite image is generated based on differences at corresponding points in a first image and a second image of the two images.

19. The method of claim 15, further comprising:
providing information indicating that the accuracy associated with the performance of the object recognition operation is likely to satisfy the threshold; and
where performing the object recognition operation comprises:
receiving an instruction to perform the object recognition operation based on providing the information indicating that the accuracy associated with the performance of the object recognition operation is likely to satisfy the threshold, and
performing the object recognition operation based on the instruction.

20. The method of claim 15, where determining that the accuracy associated with the performance of the object recognition operation is likely to satisfy the threshold comprises:
determining that the accuracy associated with the performance of the object recognition operation is likely to satisfy the threshold based on a predictive model,
the predictive model outputting a likelihood of the accuracy associated with the performance of the object recognition operation satisfying the threshold based on the reliability score.

* * * * *